United States Patent [19]

Zardi

[11] Patent Number: 4,883,646
[45] Date of Patent: Nov. 28, 1989

[54] SYSTEM AND DEVICE TO MAKE CATALYTIC BASKET WALLSFOR HETEROGENEOUS SYNTHESIS REACTORS

[75] Inventor: Umberto Zardi, Breganzona, Switzerland

[73] Assignee: Ammonia Casale S.A., Switzerland

[21] Appl. No.: 100,023

[22] Filed: Sep. 23, 1987

[30] Foreign Application Priority Data

Sep. 25, 1986 [CH] Switzerland .................. 03837/86

[51] Int. Cl.$^4$ .............................................. B01J 8/02
[52] U.S. Cl. ................................... 422/311; 422/148; 422/221; 422/310
[58] Field of Search ................ 422/148, 221, 310, 311

[56] References Cited

U.S. PATENT DOCUMENTS

| | | |
|---|---|---|
| 2,505,851 | 5/1950 | Wobker et al. |
| 4,372,920 | 2/1983 | Zardi ................................. 422/148 |
| 4,405,562 | 9/1983 | Zardi et al. |
| 4,755,362 | 7/1988 | Zardi |
| 4,769,220 | 9/1988 | Zardi |

FOREIGN PATENT DOCUMENTS

| | | |
|---|---|---|
| 743830 | 1/1944 | Fed. Rep. of Germany ...... 422/221 |
| 972297 | 7/1959 | Fed. Rep. of Germany ...... 422/221 |
| 508029 | 1/1952 | France ............................... 422/221 |

Primary Examiner—Barry S. Richman
Assistant Examiner—Jill Johnston
Attorney, Agent, or Firm—Ostrolenk, Faber, Gerb & Soffen

[57] ABSTRACT

A system to make walls for catalyst baskets for heterogeneous synthesis reactors, particularly the distribution walls which are inserted in axial reactors in order to modify them into substantially radial (or axial-radial) reactors with low energy consumptions. The distribution walls are divided into n sections. By attaching each section end to a device consisting of two flange elements, the radially longer one protruding over the distribution wall, the invention achieves truing and stiffening of the entire device. The other end extends slightly into the inside of the catalyst bed. Between the internal walls of the basket and the perforated distribution sheet, an airspace is formed by using separating rods or, in their absence, using a perforated bridge plate as the distribution wall.

2 Claims, 4 Drawing Sheets

SYSTEM AND DEVICE TO MAKE CATALYTIC BASKET WALLSFOR HETEROGENEOUS SYNTHESIS REACTORS

BACKGROUND OF THE INVENTION

1. Field of the Invention:

This invention relates to catalyst basket walls for heterogeneous synthesis reactors, particularly for the distribution walls that are inserted into the axial-flow reactors in order to modify them into substantially radial-flow reactors, for example radial or axial-radial, with the aim of obtaining low energy consumption.

The invention included also a device to implement the system.

2. Description of the Related Prior Art:

In a series of earlier patents (see for example U.S. Pat. Nos. 4,372,920 and 4,405,562), the applicant described heterogeneous synthesis reactors containing several catalyst beds, each being crossed by synthesis gas with a substantially radial flow, i.e., with axial flow through a minor portion of its height, and with radial flow through a major portion of its height.

These reactors, in particular the so-called "axial-radial" reactors, have given such positive results that the applicants have described some especially simple and advantageous systems to transform the already existing conventional totally axial reactors (a Kellogg-type for example) into axial-radial or radial reactors with the aim of reducing the energy consumption (see, for example, U.S. Pat. No. 4,755,362).

In the making of these new reactors and in particular in the implementation of the systems to modify low-yield axial reactors, the applicant found that one of the critical points is the construction of the wall of the catalyst-containing baskets of the modified reactors. In the reactors, it is necessary to obtain a uniform distribution of the gas. At the same time, a basket wall that is simple to make and mechanically strong is desired.

One must also take into account that the walls must generally be assembled inside of the existing apparatus. Thus, they must pass through a manhole of small diameter, and must therefore be formed by more than one section. A system to make the multi-element walls, particularly the centering, stiffening and coupling system, is thus critical for the obtainment of high yields in the beds (maximum exploitation of the catalyst).

SUMMARY OF THE INVENTION

The object of this invention is therefore a system to make walls for catalyst carrying baskets that are characterized by the fact that the walls of each basket are divided into many circular or polygonal units. Each unit is formed by a distribution wall permeable to gas (for example under the form of a perforated plate) with a large cross section, and a wall permeable to gas (for example in the form of a net) with a small cross section. The first of the walls or plates is situated on the outside and the second of said walls is situated on the inside in contact with the catalyst. The longitudinal edges of the two walls are welded on one side to a flat flange that lays on an axial plane and that extends in one direction outside the gas distribution plate and in the other direction towards the inside of the catalyst basket. The part of the flange protruding on the outside of the gas distribution wall provides the centering and stiffening of this wall, whereas the part of the flange extending on the inside of the catalyst basket (eventually equipped with perforations or another system), provides the connection through clamping (for example bolts, zippers and the like) to the said adjacent panel.

The above-mentioned walls can be in contact one with the other or may be separated in such a way to create an airspace in order to further improve the gas distribution in the catalytic beds. The airspace can be obtained by using for example, separating rods or by using a perforated bridge plate. In the latter case, an external plate permeable to gas (for example a perforated sheet) can be provided in order to secure a correct distribution of the gas.

In a preferred embodiment of the device, for the implementation of the system according to the invention, two flange pieces of different radial lengths are held together by a bolt at one of their free ends. The piece that extends furthest is welded to the wall and extends beyond the distribution wall towards the external cartridge wall. The second of the pieces is also welded and protrudes slightly inside of the catalyst bed.

DESCRIPTION OF THE DRAWINGS

The various aspects and advantages of the invention are better shown in the following descriptions of the preferred (and not limitative) embodiments represented in the attached drawings, in which.

DETAILED DESCRIPTION OF THE PREFERRED EMBODIMENTS

Figure 1:
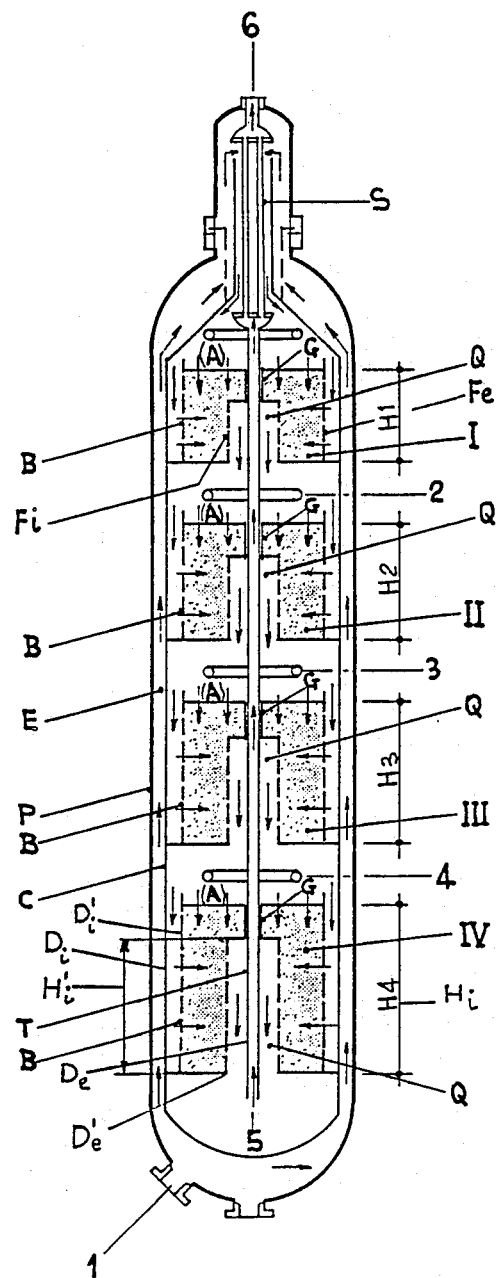
FIG. 1 is a schematic view of a partially cross-section longitudinal portion of one type of reactor possibly obtained through its modification by using the system patented by the assignee, i.e., a axial-flow reactor (for example the high energy consuming Kellogg type reactor) modified into a prevailingly radial-flow reactor, or the so-called "axial-radial" reactor, with low energy consumption.

FIG. 1 represents one of the different types of modified reactors set forth in the above mentioned U.S. Pat. No. 4,755,362, the specification of which is incorporated by reference. Briefly, the reactor comprises an external shell P; a cartridge C (which has a diameter Di and forms the airspace E); many catalyst beds I, II, III and IV, preferably with an axial height Hi increasing from the upper to the lower beds; a gas distribution wall Fe with perforations the entire height of the bed Hi and with diameter D'i; an internal wall Fi perforated on a height H'i lower than Hi and with diameter D'e; a central pipe T of diameter De; and a heat exchanger S. The fresh gas enters through 1, goes up the airspace E, and exchanges heat in S with the hot gas through the pipe T. A small portion of the gas (A) penetrates catalyst bed I where the catalyst bed is open at its top. The gas crosses the first shorter upper part at the height Hi-H'i with axial flow and a large portion of the gas (B) crosses the height H'i with radial flow.

The reacted gas is collected in the internal zones between T and Fi and exits at the top of the reactor.

FIG. 1 schematically represents different quench gas distributors (2, 3 and 4) that have preferably the structure and the layout described in U.S. Pat. No. 4,755,362.

In the continuation of their experimental research in the construction of axial-radial reactors, as well as in the implementation of the method of modifying totally axial reactors (i.e. Kellogg type) into the exclusive Ammonia Casale type axial-radial reactors, the applicant has ascertained that particular care must be used when making the catalyst basket walls.

Figure 2:
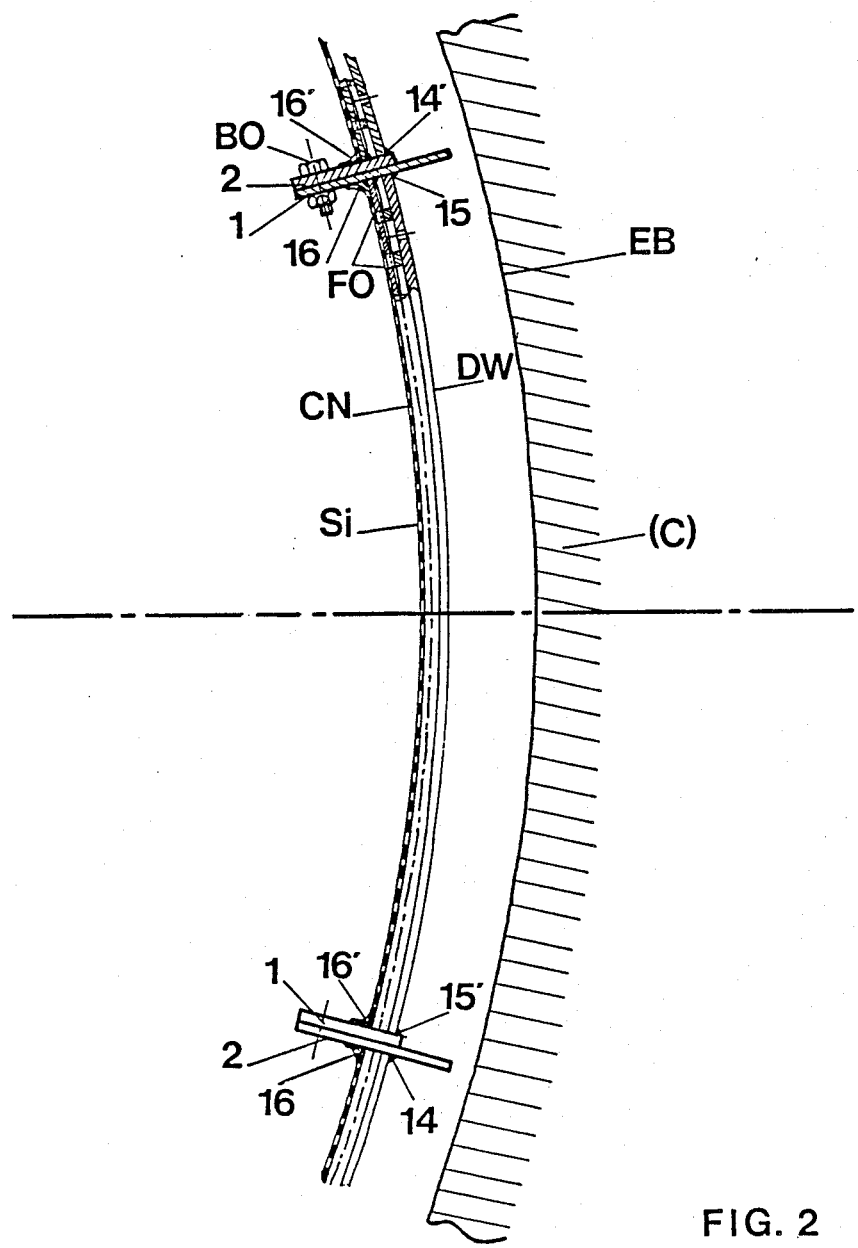
FIG. 2 is a schematic view of a cross-section along a radial plane of a small circular portion (on an enlarged scale with respect to FIG. 1) of the reactor using the system (according to the invention) of catalyst basket walls.

A preferred embodiment of the system according to the invention is represented in FIG. 2 in which: CN (catalyst net) indicates an external net of the catalytic basket, DW (distribution wall) represents a distribution wall of synthesis gas, and EB (existing basket) represents the wall already existing in the axial reactor and corresponding to cartridge C of FIG. 1.

Figure 3:
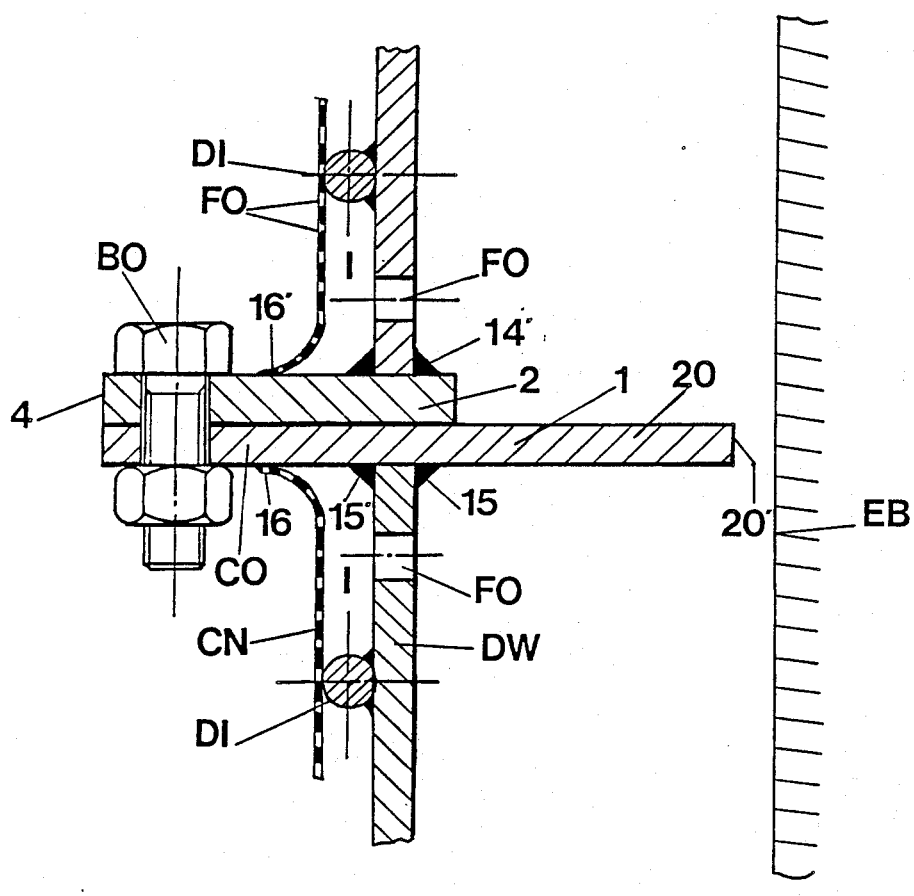
FIG. 3 is a schematic view of a cross-section along a radial plane of an enlarged detail of the coupling zone of the various sectors of the wall illustrated in FIG. 2 according to a first airspace-forming embodiment.

According to an aspect of the invention, the net CN is divided into more than one section (circular or polygonal) and between the distribution wall DW (provided with perforations FO) and each sector of the net CN, an airspace I is obtained. Airspace I is provided either through the insertion of separating rods DT (welded to DW) [FIG. 3] or by using as a distribution wall a bridge perforated wall, like the schematic type shown in FIGS. 4, 4A and 4B. The securing together of the whole device is made by means of a device comprising a rib CO consisting of two pieces 1 and 2 which are held together at one inner end through blocking or locking means, e.g., through bolt BO. Pieces 1 and 2 coincident ends at their other extremity. The flange piece 1 has a radial extension greater than that of the piece 2 and is welded at 14 and 25 to the perforated plate DW.

Piece 1 has an extension 20 (FIGS. 3 and 4), and at its extremity 20 is free to approach or to move away from the internal surface of EB in such a way as to absorb the thermal expansion. Piece 1 has the function of centering and stiffening the entire fixing device and to offer at 16 a welding base at the end of a section of net CN. Piece 2 is welded at 14' and 15' to the distribution wall DW but slightly protrudes beyond the said wall DW.

Figure 4:
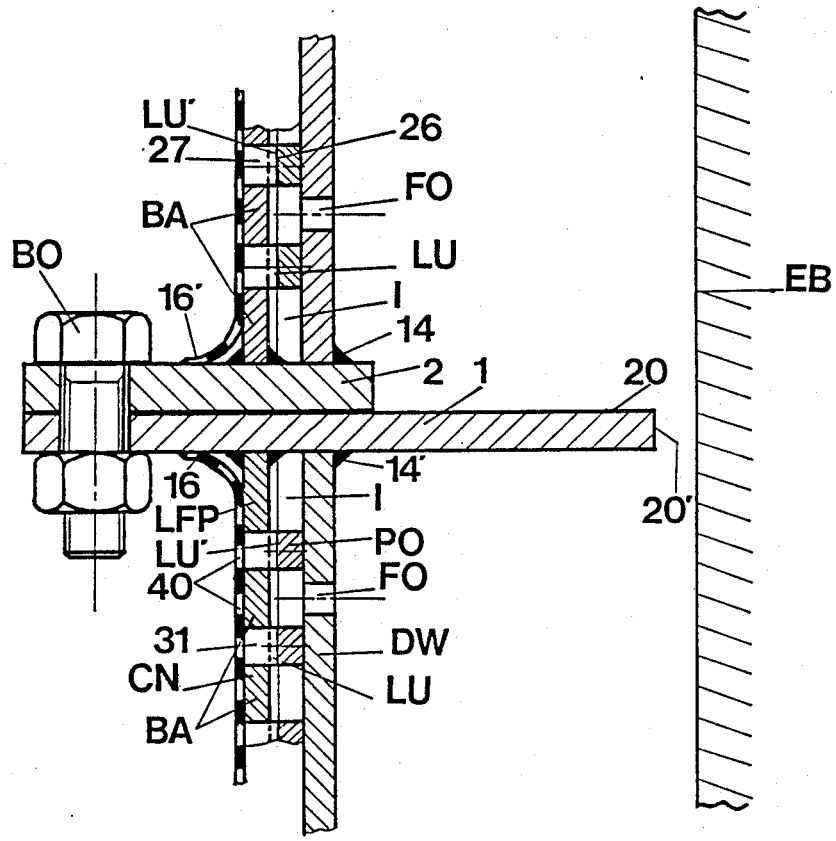
FIG. 4 is a schematic view of a cross-section according to a second method of forming an airspace.
Figure 4A:
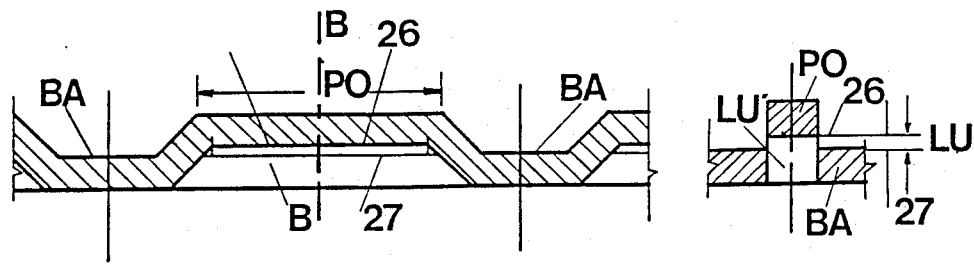
FIG. 4A is a schematic view of a portion of the perforated bridge wall.
Figure 4B:
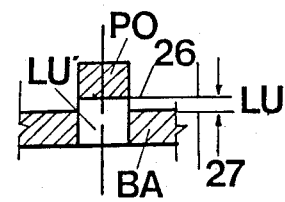
FIG. 4B is the cross-section B—B of the FIG. 4A.

At 16', piece 2 is welded to the other end of the section of net CN. In other words, in the system according to the invention, the net wall CN is divided into n sections S1, S2...Sn, each section Si (FIG. 2) being secured with an end 16 to the truing or centering piece 1 and with the other end 16' to the piece 2 which is radially shorter. As already explained, the airspace I between the sections of the net wall Si and the corresponding portions of the perforated wall DW, is obtained by either welding the separating rods DI to the full portions of DW (that is, not over the holes FO that otherwise would be throttled) or by utilizing a perforated bridge plate as wall DW, as shown in FIG. 4, 4A and 4B. In these figures, one can see between the perforated wall DW and the net wall CN that the separators DI are absent and that instead the bridge perforated plate LFP has been introduced that presents portions BA having a diameter substantially the same as the external diameter of the wall CN which is fixed onto BA, and other portions with bridge perforations, i.e., raised portions PO which assume a diameter substantially the same as the internal diameter of the distribution wall DW and are fixed to it. Between BA and PO, a perforation LU is created from the lines 26 and 27.

The zones in which the perforations LU are created are spaced apart, that is they are not in phase with respect to the perforations FO of DW, so that the gas entering FO radially runs a minimum axial distance and passes by means of the two perforations LU and LU' into the perforations 40 of the net CN.

What is claimed is:

1. An apparatus for joining two outer wall segments of a catalyst basket inserted into an existing heterogeneous synthesis reactor for revamping the reactor, comprising:

two elongated upstanding flange plates having heights substantially coextensive with the wall segments, the flange plates having different widths and oriented in a substantially radial direction with respect to a central longitudinal axis of the basket, both flange plates having portions extending inside the catalyst basket, and one flange plate having a portion extending outward past the catalyst basket outer wall segment, the flange plates stiffening and centering the catalyst basket for uniform gas distribution in the reactor; and, means for joining together the portions of the two flange plates extending inside the catalyst basket.

2. An apparatus as claimed in claim 1, wherein the means for joining the two flange plates comprised a bolt.

* * * * *